US012393130B2

(12) United States Patent
Sekido et al.

(10) Patent No.: US 12,393,130 B2
(45) Date of Patent: Aug. 19, 2025

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Kunihiko Sekido, Shizuoka (JP); Masashi Nishi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 504 days.

(21) Appl. No.: 17/930,206

(22) Filed: Sep. 7, 2022

(65) Prior Publication Data

US 2023/0090596 A1 Mar. 23, 2023

(30) Foreign Application Priority Data

Sep. 15, 2021 (JP) ................................ 2021-150501
Aug. 23, 2022 (JP) ................................ 2022-132499

(51) Int. Cl.
*G03G 5/147* (2006.01)
*G03G 21/18* (2006.01)

(52) U.S. Cl.
CPC ..... *G03G 5/14704* (2013.01); *G03G 5/14708* (2013.01); *G03G 5/14734* (2013.01); *G03G 5/14786* (2013.01); *G03G 21/1814* (2013.01)

(58) Field of Classification Search
CPC ........... G03G 5/14704; G03G 5/14708; G03G 5/14734; G03G 5/14786; G03G 21/1814
See application file for complete search history.

(56) References Cited

U.S. PATENT DOCUMENTS 5,604,061 A 2/1997 Sekido
6,228,546 B1 5/2001 Kashizaki
(Continued)

FOREIGN PATENT DOCUMENTS

JP 2009229495 A * 10/2009
JP 2011-138030 A 7/2011

OTHER PUBLICATIONS

English machine translation of the description of JP-2009229495-A (Year: 2009).*
(Continued)

*Primary Examiner* — Mark F. Huff
*Assistant Examiner* — Boone Alexander Evans
(74) *Attorney, Agent, or Firm* — VENABLE LLP

(57) ABSTRACT

Provided is an electrophotographic photosensitive member having a satisfactory chargeability and being excellent in fogging suppression. The electrophotographic photosensitive member is an electrophotographic photosensitive member including a surface protective layer, wherein the surface protective layer is a polymerized film of a composition containing a compound having one of an acryloyloxy group or a methacryloyloxy group, a conductive particle, and an organic salt formed of at least one organic cation selected from the group consisting of: imidazolium; pyridinium; pyrrolidinium; piperidinium; a tetraalkylammonium; and a tetraalkylphosphonium, and at least one anion selected from the group consisting of organic or inorganic anions, and wherein the content of the organic salt is 0.1 mass % to 10.0 mass % with respect to the total mass of the conductive particle.

6 Claims, 4 Drawing Sheets

(56) References Cited

U.S. PATENT DOCUMENTS

| | | | |
|---|---|---|---|
| 7,141,341 B2 | 11/2006 | Sekido | |
| 8,343,699 B2 | 1/2013 | Nagasaka | |
| 8,465,889 B2 | 6/2013 | Sekido | |
| 8,524,430 B2 | 9/2013 | Takagi | |
| 8,546,050 B2 | 10/2013 | Maruyama | |
| 8,632,931 B2 | 1/2014 | Sekido | |
| 8,795,936 B2 | 8/2014 | Sekido | |
| 9,029,054 B2 | 5/2015 | Okuda | |
| 9,063,505 B2 | 6/2015 | Sekiya | |
| 9,069,267 B2 | 6/2015 | Kaku | |
| 9,164,406 B2 | 10/2015 | Nishi | |
| 9,207,550 B2 | 12/2015 | Okuda | |
| 9,280,072 B2 | 3/2016 | Ogaki | |
| 9,335,645 B2 | 5/2016 | Tagami | |
| 9,442,401 B2 | 9/2016 | Sekido | |
| 9,477,163 B2 | 10/2016 | Nishi | |
| 9,760,030 B2 | 9/2017 | Sekiya | |
| 9,772,568 B2 | 9/2017 | Sekido | |
| 9,811,011 B2 | 11/2017 | Nishi | |
| 9,851,648 B2 | 12/2017 | Nishi | |
| 9,864,285 B2 | 1/2018 | Nishi | |
| 9,921,498 B2 | 3/2018 | Sekido | |
| 10,372,050 B2 | 8/2019 | Nishi | |
| 2009/0092912 A1* | 4/2009 | Wu | G03G 5/061443 430/58.35 |
| 2019/0265602 A1* | 8/2019 | Nakamura | G03G 5/0609 |
| 2021/0318628 A1 | 10/2021 | Sekido | |
| 2021/0318629 A1 | 10/2021 | Nishi | |

OTHER PUBLICATIONS

U.S. Appl. No. 08/635,520, filed Apr. 22, 1996, Akihiro Senoo.
U.S. Appl. No. 17/823,627, filed Aug. 31, 2022, Masashi Nishi.
U.S. Appl. No. 17/936,088, filed Sep. 28, 2022, Shuntaro Watanabe.

* cited by examiner

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present invention relates to an electrophotographic photosensitive member, and a process cartridge and an electrophotographic apparatus each including the electrophotographic photosensitive member.

Description of the Related Art

It is known that, in an electrophotographic photosensitive member to be used for an electrophotographic apparatus, a protective layer formed of a polymerized film of a compound having one of an acryloyloxy group or a methacryloyloxy group, which is excellent in mechanical durability, is arranged for the purposes of lengthening the lifetime of the electrophotographic photosensitive member and increasing image quality at the time of repeated use thereof.

In Japanese Patent Application Laid-Open No. 2009-229495, it is known that, in order to improve electric characteristics of an electrophotographic photosensitive member using such protective layer, a metal oxide is added into the protective layer.

In addition, in Japanese Patent Application Laid-Open No. 2011-138030, it is also known that various conductive agents other than the metal oxide are added, and it is known that an organic salt is added into the protective layer.

SUMMARY OF THE INVENTION

According to an investigation made by the inventors, the electrophotographic photosensitive member described in Japanese Patent Application Laid-Open No. 2009-229495 or Japanese Patent Application Laid-Open No. 2011-138030 is not sufficiently improved in chargeability depending on an electrophotographic process, causing an image defect such as fogging in some cases.

Accordingly, an object of the present invention is to provide an electrophotographic photosensitive member having excellent chargeability, thereby ameliorating fogging.

The above-mentioned object is achieved by the present invention described below. That is, according to the present invention, there is provided an electrophotographic photosensitive member including a surface protective layer, wherein the surface protective layer is a polymerized film of a composition containing: a compound having one of an acryloyloxy group or a methacryloyloxy group; a conductive particle; and an organic salt formed of: one organic cation selected from the group consisting of: imidazolium; pyridinium; pyrrolidinium; piperidinium; a tetraalkylammonium; and a tetraalkylphosphonium; and at least one anion selected from the group consisting of: an organic anion; and an inorganic anion, and wherein a content of the organic salt is 0.1 mass % to 10.0 mass % with respect to a total mass of the conductive particle.

According to the present invention, the electrophotographic photosensitive member having satisfactory chargeability, thereby ameliorating fogging, can be provided.

Further features of the present invention will become apparent from the following description of exemplary embodiments with reference to the attached drawings.

DESCRIPTION OF THE EMBODIMENTS

The present invention is described in detail below by way of exemplary embodiments.

As a result of an investigation made by the inventors, it has been found that the photosensitive member used in the related art, whose surface protective layer is a polymerized film of a composition containing a compound having one of an acryloyloxy group or a methacryloyloxy group and a conductive particle, has room for improvement in chargeability.

The inventors have made investigations in order to solve the technical problem that has been occurring in the related art described above, and as a result, have found that, when a surface protective layer containing an organic salt having a specific structure within the range of from 0.1 mass % to 10.0 mass % with respect to the conductive particle is used, the technical problem that has been occurring in the related art can be solved. The inventors presume as described below as to the reason why an electrophotographic photosensitive member according to the present invention is excellent in chargeability.

In the present invention, an improvement in chargeability occurs through injection of a charge into the conductive particle from a charging member, but in the related art, sufficient chargeability is not obtained owing to an insufficient ratio of an area in which the conductive particle can be exposed on the outermost surface of the surface protective layer to the surface area of the entire surface protective layer.

However, the organic salt having a specific structure has high compatibility with the compound having one of an acryloyloxy group or a methacryloyloxy group in the polymerized film, and is in a uniform molecular dispersion state in the formed polymerized film. Accordingly, the organic salt can be present in a region in which the particles are not exposed. As a result, a charge injected into the organic salt can be quickly transferred to the conductive particle to improve the chargeability.

When the addition amount of the organic salt is less than 0.1 mass %, the organic salt cannot be sufficiently present on the surface of the surface protective layer, and hence sufficient chargeability cannot be obtained. Meanwhile, when the addition amount is more than 10 mass %, charge migration between the conductive particle is hampered, and hence sufficient chargeability cannot be obtained.

The effect of the present invention can be achieved by virtue of the components synergistically acting on each other like the mechanism described above.

[Electrophotographic Photosensitive Member]

Figure 2:
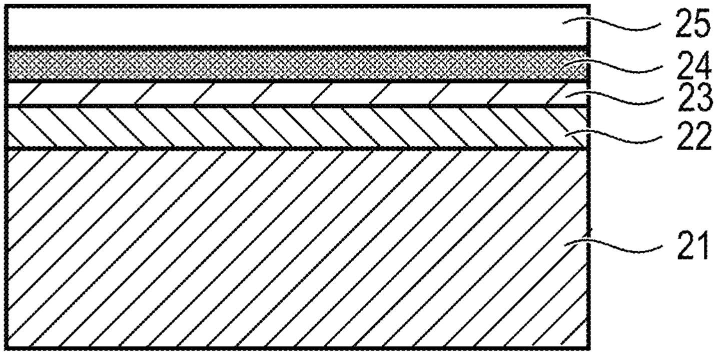
FIG. 2 is a schematic view for illustrating an example of the configuration of the electrophotographic photosensitive member of the present invention.

The electrophotographic photosensitive member of the present invention has a feature of including a surface protective layer. In particular, a case in which the electrophotographic photosensitive member includes a charge-generating layer, a charge-transporting layer, and the surface protective layer on a support is preferred. In FIG. 2, there is illustrated an electrophotographic photosensitive member including a support 21, an undercoat layer 22, a charge-generating layer 23, a charge-transporting layer 24, and a surface protective layer 25.

As a method of producing the electrophotographic photosensitive member of the present invention, there is given a method involving preparing coating liquids for respective layers to be described later, applying the coating liquids in a desired order of layers, and drying the coating liquids. In this case, as a method of applying the coating liquids, there are given, for example, dip coating, spray coating, inkjet coating, roll coating, die coating, blade coating, curtain coating, wire bar coating, and ring coating. Of those, dip coating is preferred from the viewpoints of efficiency and productivity.

Each layer is described below.

<Support>

In the present invention, the electrophotographic photosensitive member includes a support, and the support is preferably a conductive support having conductivity. In addition, examples of the shape of the support include a cylindrical shape, a belt shape, and a sheet shape. Of those, a cylindrical support is preferred. In addition, the surface of the support may be subjected to, for example, electrochemical treatment such as anodization, blast treatment, or cutting treatment.

A metal, a resin, glass, or the like is preferred as a material for the support.

Examples of the metal include aluminum, iron, nickel, copper, gold, stainless steel, and alloys thereof. Of those, an aluminum support using aluminum is preferred.

In addition, conductivity may be imparted to the resin or the glass through treatment involving, for example, mixing or coating the resin or the glass with a conductive material.

<Conductive Layer>

In the present invention, a conductive layer may be arranged on the support. The arrangement of the conductive layer can conceal flaws and unevenness in the surface of the support, and control the reflection of light on the surface of the support.

The conductive layer preferably contains a conductive particle and a resin.

A material for the conductive particle is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, a metal oxide is preferably used as the conductive particle, and in particular, titanium oxide, tin oxide, and zinc oxide are more preferably used.

When the metal oxide is used as the conductive particle, the surface of the metal oxide may be treated with a silane coupling agent or the like, or the metal oxide may be doped with an element, such as phosphorus or aluminum, or an oxide thereof.

In addition, each of the conductive particle may be of a laminated configuration having a core particle and a coating layer coating the particle. Examples of the core particle include titanium oxide, barium sulfate, and zinc oxide. The coating layer is, for example, a metal oxide such as tin oxide.

In addition, when the metal oxide is used as the conductive particle, their volume-average particle diameter is preferably 1 nm to 500 nm, more preferably 3 nm to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the conductive layer may further contain a concealing agent, such as a silicone oil, resin particles, or titanium oxide.

The conductive layer has an average thickness of preferably 1 μm to 50 μm, particularly preferably 3 μm to 40 μm.

The conductive layer may be formed by preparing a coating liquid for a conductive layer containing the above-mentioned materials and a solvent, forming a coat thereof, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. A dispersion method for dispersing the conductive particle in the coating liquid for a conductive layer is, for example, a method involving using a paint shaker, a sand mill, a ball mill, or a liquid collision-type high-speed disperser.

<Undercoat Layer>

In the present invention, an undercoat layer may be arranged on the support or the conductive layer. The arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamide acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further contain an electron-transporting substance, a metal oxide, a metal, a conductive polymer, and the like for the purpose of improving electric characteristics. Of those, an electron-transporting substance and a metal oxide are preferably used.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting substance having a polymerizable functional group may be used as the electron-transporting substance and copolymerized with the above-mentioned monomer having a polymerizable functional group to form the undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

In addition, the undercoat layer may further contain an additive.

The undercoat layer has an average thickness of preferably 0.1 μm to 50 μm, more preferably 0.2 μm to 40 μm, particularly preferably 0.3 μm to 30 μm.

The undercoat layer may be formed by preparing a coating liquid for an undercoat layer containing the above-mentioned materials and a solvent, forming a coat thereof, and drying and/or curing the coat. Examples of the solvent to be used for the coating liquid include an alcohol-based solvent, a ketone-based solvent, an ether-based solvent, an ester-based solvent, and an aromatic hydrocarbon-based solvent.

<Photosensitive Layer>

When the electrophotographic photosensitive member according to the present invention includes a photosensitive layer, the photosensitive layer is mainly classified into (1) a laminate-type photosensitive layer and (2) a monolayer-type photosensitive layer. (1) The laminate-type photosensitive layer has a charge-generating layer containing a charge-generating substance and a charge-transporting layer containing a charge-transporting substance. (2) The monolayer-type photosensitive layer has a photosensitive layer containing both a charge-generating substance and a charge-transporting substance.

(1) Laminate-Type Photosensitive Layer

The laminate-type photosensitive layer has the charge-generating layer and the charge-transporting layer.

(1-1) Charge-Generating Layer

The charge-generating layer preferably contains the charge-generating substance and a resin.

Examples of the charge-generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge-generating substance in the charge-generating layer is preferably 40 mass % to 85 mass %, more preferably 60 mass % to 80 mass % with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further contain an additive, such as an antioxidant or a UV absorber. Specific examples thereof include a hindered phenol compound, a hindered amine compound, a sulfur compound, a phosphorus compound, and a benzophenone compound.

The charge-generating layer has an average thickness of preferably 0.1 μm to 1 μm, more preferably 0.15 μm to 0.4 μm.

The charge-generating layer may be formed by preparing a coating liquid for a charge-generating layer containing the above-mentioned materials and a solvent, forming a coat thereof, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

(1-2) Charge-Transporting Layer

The charge-transporting layer preferably contains the charge-transporting substance and a resin.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content of the charge-transporting substance in the charge-transporting layer is preferably 25 mass % to 70 mass %, more preferably 30 mass % to 55 mass % to with respect to the total mass of the charge-transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting substance and the resin is preferably from 4:10 to 20:10, more preferably from 5:10 to 12:10.

In addition, the charge-transporting layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The charge-transporting layer has an average thickness of preferably 5 μm to 50 μm, more preferably 8 μm to 40 μm, particularly preferably 10 μm to 30 μm.

The charge-transporting layer may be formed by preparing a coating liquid for a charge-transporting layer containing the above-mentioned materials and a solvent, forming a coat thereof, and drying the coat. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

(2) Monolayer-Type Photosensitive Layer

The monolayer-type photosensitive layer may be formed by preparing a coating liquid for a photosensitive layer containing the charge-generating substance, the charge-transporting substance, a resin, and a solvent, forming a coat thereof, and drying the coat. Examples of the charge-generating substance, the charge-transporting substance, and the resin are the same as those of the materials in the section "(1) Laminate-type Photosensitive Layer."

<Surface Protective Layer>

In the present invention, the surface protective layer is arranged on the photosensitive layer.

The surface protective layer is a polymerized film of a composition containing a compound having one of an acryloyloxy group or a methacryloyloxy group, a conductive particle, and an organic salt, and the content of the organic salt in the composition is 0.1 mass % to 10.0 mass % with respect to the conductive particle.

The "compound having one of an acryloyloxy group or a methacryloyloxy group" refers to a curable compound (polymerizable monomer) having one of an acryloyloxy group ($CH_2$=CHCOO—) or a methacryloyloxy group ($CH_2$=$CCH_3$COO—). Specific examples of the compound are given below.

Examples of the compound having one acryloyloxy group or methacryloyloxy group include ester-based monomers of acrylic acid or methacrylic acid (e.g., methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, iso-butyl acrylate, iso-butyl methacrylate, sec-butyl acrylate, sec-butyl methacrylate, tert-butyl acrylate, tert-butyl methacrylate, pentyl acrylate, pentyl methacrylate, hexyl acrylate, hexyl methacrylate, heptyl acrylate, heptyl methacrylate, 2-ethylhexyl acrylate, 2-ethylhexyl methacrylate, octyl acrylate, octyl methacrylate, nonyl acrylate, nonyl methacrylate, decyl acrylate, decyl methacrylate, dodecyl acrylate, dodecyl methacrylate, tetradecyl acrylate, tetradecyl methacrylate, hexadecyl acrylate, hexadecyl methacrylate, octadecyl acrylate, octadecyl methacrylate, eicosyl acrylate, eicosyl methacrylate, docosyl acrylate, docosyl methacrylate, cyclopentyl acrylate, cyclopentyl methacrylate, cyclohexyl acrylate, cyclohexyl methacrylate, cycloheptyl acrylate, cycloheptyl methacrylate, benzyl acrylate, benzyl methacrylate, phenyl acrylate, phenyl methacrylate, methoxyethyl acrylate, methoxyethyl methacrylate, dimethylaminoethyl acrylate, dimethylaminoethyl methacrylate, dimethylaminopropyl acrylate, dimethylaminopropyl methacrylate, 2-chloroethyl acrylate, 2-chloroethyl methacrylate, 2-fluoroethyl acrylate, 2-fluoroethyl methacrylate, 2-cyanoethyl acrylate, 2-cyanoethyl methacrylate, methoxy diethylene glycol acrylate, methoxy diethylene glycol methacrylate, methoxy dipropylene glycol acrylate, methoxy dipropylene glycol methacrylate, methoxy triethylene glycol acrylate, and methoxy triethylene glycol methacrylate), and 1-(methacryloyloxyethoxycarbonyl)-2-(3'-chloro-2'-hydroxypropoxycarbonyl)benzene.

Examples of the compound having two acryloyloxy groups or methacryloyloxy groups include ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, hexapropylene glycol diacrylate, hexapropylene glycol dimethacrylate, polypropylene glycol diacrylate, polypropylene glycol dimethacrylate, butylene glycol diacrylate, butylene glycol dimethacrylate, neopentyl glycol diacrylate, neopentyl glycol dimethacrylate, 1,3-butanediol diacrylate, 1,3-butanediol dimethacrylate, 1,4-butanediol diacrylate, 1,4-butanediol dimethacrylate, 1,5-pentanediol diacrylate, 1,5-pentanediol dimethacrylate, 1,6-hexanediol diacrylate, 1,6-hexanediol dimethacrylate, pentaerythritol diacrylate, pentaerythritol dimethacrylate, trimethylolpropane diacrylate, trimethylolpropane dimethacrylate, bisphenol A diacrylate, bisphenol A dimethacrylate, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, 2,2-bis(4-acryloxypolyethoxyphenyl)propane, 2,2-bis(4-methacryloxypolyethoxyphenyl)propane, bisphenol A diglycidyl ether diacrylate, bisphenol A diglycidyl ether dimethacrylate, neopentyl glycol-modified trimethylolpropane diacrylate, and a urethane diacrylate compound.

Examples of the compound having three acryloyloxy groups or methacryloyloxy groups include trimethylolpropane triacrylate, trimethylolpropane trimethacrylate, pentaerythritol triacrylate, pentaerythritol trimethacrylate, ethylene oxide-modified trimethylolpropane triacrylate, ethylene oxide-modified trimethylolpropane trimethacrylate, trimethylolpropane triglycidyl ether triacrylate, and trimethylolpropane triglycidyl ether trimethacrylate.

Examples of the compound having four acryloyloxy groups or methacryloyloxy groups include tetramethylolpropane tetraacrylate, tetramethylolpropane tetramethacrylate, pentaerythritol tetraacrylate, and pentaerythritol tetramethacrylate.

Examples of the compound having five acryloyloxy groups or methacryloyloxy groups include dipentaerythritol pentaacrylate and dipentaerythritol pentamethacrylate.

Examples of the compound having six acryloyloxy groups or methacryloyloxy groups include dipentaerythritol hexaacrylate and dipentaerythritol hexamethacrylate.

Examples of the conductive particle to be incorporated into the surface protective layer include metal oxides, such as titanium oxide, tin oxide, and zinc oxide.

The volume-average particle diameter of the conductive particle is preferably 1 nm to 500 nm, more preferably 3 nm to 400 nm.

When the metal oxide is used as the conductive particle, the surface of the metal oxide may be treated with a silane coupling agent or the like. In addition, an element, such as phosphorus or aluminum, or an oxide thereof may be incorporated into the metal oxide. When titanium oxide is used as the metal oxide, it is appropriate to incorporate tantalum or niobium thereinto, and of those, niobium is preferred.

When the conductive particle is titanium oxide containing niobium, the content of niobium is preferably 2.6 mass % to 10.0 mass % with respect to the total mass of the conductive particle.

In addition, the conductive particle may be of a laminated configuration having a core particle and a coating layer coating the particle. Examples of the core particle include metal oxides, such as titanium oxide and zinc oxide, and barium sulfate. Examples of the coating layer include metal oxides, such as zinc oxide, tin oxide, and titanium oxide.

Figure 3:
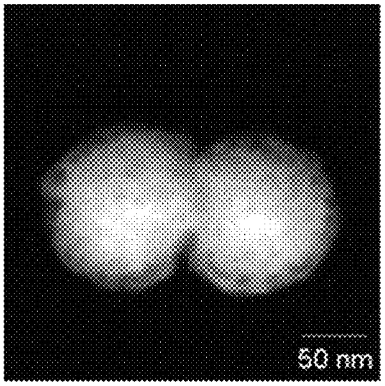
FIG. 3 is a view based on an example of a STEM image (photograph) of a conductive particle according to the present invention.
Figure 4:
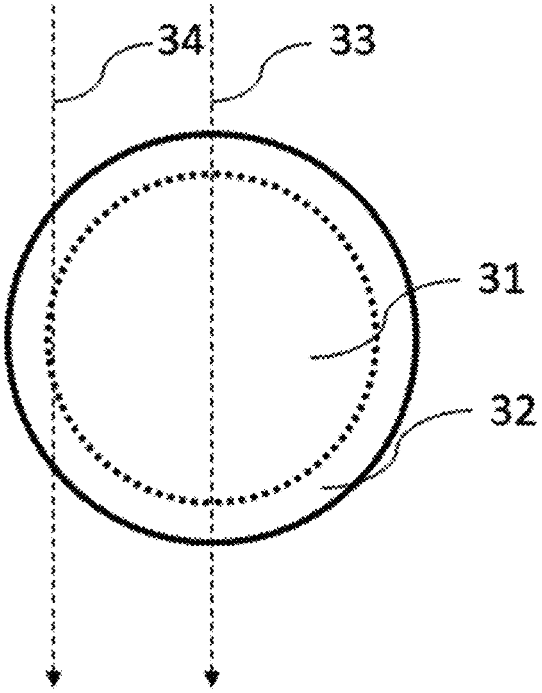
FIG. 4 is a view for illustrating EDS analysis of the conductive particle according to the present invention.

The conductive particle is particularly preferably titanium oxide particles each of which contains niobium atoms, and has a configuration in which niobium is localized in the vicinity of the surface of the particle. This is because the localization of niobium in the vicinity of the surface enables efficient transfer of a charge. More specifically, in each of the titanium oxide particles, a niobium/titanium atomic concentration ratio at an inside portion at 5% of a maximum diameter of the particle measured from the surface of the particle is 2.0 or more times as high as a niobium/titanium atomic concentration ratio at a center of the particle in EDS analysis with a scanning transmission electron microscope (STEM). A STEM image of an example (X1) of titanium oxide particles used in Examples of the present invention is shown in FIG. 3. In addition, the STEM image of FIG. 3 is schematically illustrated in FIG. 4. As described in detail later, titanium oxide particles each containing niobium used in Examples of the present invention are produced by coating titanium oxide particles each serving as a core with titanium oxide containing niobium, and then firing the resultant. Accordingly, the coated titanium oxide containing niobium is conceived to undergo crystal growth as niobium-doped titanium oxide through so-called epitaxial growth along a crystal of the titanium oxide serving as the core. As shown in FIG. 3, the thus produced titanium oxide containing niobium has a lower density in the vicinity of the surface than at the particle central portion, indicating a core-shell-like form. In addition, in the EDS analysis with a STEM, an X-ray is transmitted through an entire particle, and hence, as illustrated in FIG. 4, as compared to EDS analysis at a particle central portion 31, EDS analysis at the inside portion at 5% of the maximum diameter of the particle measured from the surface of the particle is more significantly influenced by a surface vicinity 32. In addition, FIG. 4 is a conceptual illustration of irradiation with an X-ray 33 for analyzing the central portion of a conductive particle and an X-ray 34 for analyzing the inside portion at 5% of the primary particle diameter from the surface of the conductive particle. That is, when the niobium/titanium atomic concentration ratio at the inside portion at 5% of the maximum diameter of the particle from the surface of the particle is 2.0 or more times as high as the niobium/titanium atomic concentration ratio at the center of the particle in such EDS analysis with a STEM as described above, it is conceived that a state in which the niobium element is localized in the vicinity of the surface is established.

The EDS analysis with a TEM may involve observation with a scanning transmission electron microscope and measurement of the niobium/titanium atomic concentration ratios by EDS. In addition, the niobium/titanium atomic concentration ratios may also be directly measured from the electrophotographic photosensitive member by slicing the electrophotographic photosensitive member through use of a microtome, Ar milling, FIB, or the like.

In the present invention, the organic salt is a salt formed of an organic cation and an organic or inorganic anion. The organic cation is, for example, at least one selected from the group consisting of: imidazolium; pyridinium; a tetraalkylammonium; a tetraalkylphosphonium; pyrrolidinium; and piperidinium. The anion is at least one selected from the group consisting of: an organic anion; and an inorganic anion, and examples thereof include a carboxylate, a phosphate, a halogenate, a sulfate, a sulfonate, a borate, a thiocyanate, and a sulfonylimide.

As a specific structure of the organic salt, there is given a compound represented by any one of the following formulae (structural formulae) A to E:

(A)

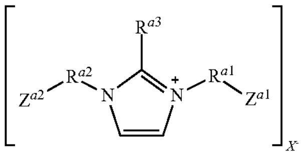

-continued (B)

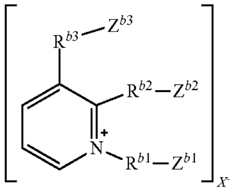

(C)

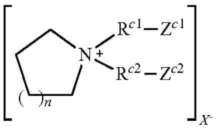

(D)

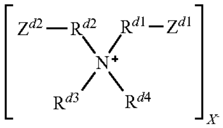

(E)

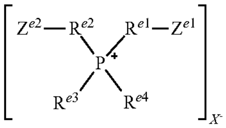

in the formulae (A) to (E), $R^{a1}$, $R^{a2}$, $R^{b1}$, $R^{b2}$, $R^{b3}$, $R^{c1}$, $R^{c2}$, $R^{d1}$, $R^{d2}$, $R^{e1}$, and $R^{e2}$ each independently represent an alkylene group having 8 or less carbon atoms, $R^{a3}$, $R^{d3}$, $R^{d4}$, $R^{e3}$, and $R^{e4}$ each independently represent a hydrogen atom or an alkyl group having 8 or less carbon atoms, $Z^{a1}$, $Z^{a2}$, $Z^{b1}$, $Z^{b2}$, $Z^{b3}$, $Z^{c1}$, $Z^{d1}$, $Z^{d2}$, $Z^{e1}$, and $Z^{e2}$ each independently represent a functional group selected from a hydrogen atom, a cyano group, an acryloyloxy group, a methacryloyloxy group, and a vinyl group, and $X^-$s each independently represent an anion selected from $Cl^-$, $Br^-$, $I^-$, $R^{f1}COO^-$, where $R^{f1}$ represents an alkyl group or a perfluoroalkyl group having 3 or less carbon atoms, $R^{f2}PO_4^-$, where $R^{f2}$ represents an alkyl group having 4 or less carbon atoms, $R^{f3}SO_4^-$, where $R^{f3}$ represents an alkyl group having 8 or less carbon atoms, $R^{f4}SO_3^-$, where $R^{f4}$ represents an alkyl group or a perfluoroalkyl group having 4 or less carbon atoms, $(R^{f5}SO_2)N^-$, where $R^{f5}$ represents F or a perfluoroalkyl group having 2 or less carbon atoms, $R^{f6}BF_2$, where $R^{f6}$ represents F or a trifluoromethyl group, $SCN^-$, and $(CN)_2N^-$, and in the formula (C), "n" represents 1 or 2.

Herein, when the organic salt has a polymerizable functional group such as an acryloyloxy group, the polymerized film serving as the surface protective layer according to the present invention contains a polymerization product of a composition containing the organic salt.

Specific examples of the organic salt are shown in Tables 1 to 5 below.

TABLE 1

| Compound | Cation | | | | | |
|---|---|---|---|---|---|---|
| number | $R^{a1}$ | $R^{a2}$ | $R^{a3}$ | $Z^{a1}$ | $Z^{a2}$ | Anion |
| A1 | $—CH_2—$ | $—C_2H_4—$ | $—CH_3$ | —H | —H | $(CF_3SO_2)_2N^-$ |
| A2 | $—CH_2—$ | $—C_2H_4—$ | —H | —H | —H | $(CF_3SO_2)_2N^-$ |
| A3 | $—CH_2—$ | $—C_2H_4—$ | $—CH_3$ | —H | —H | $Cl^-$ |
| A4 | $—CH_2—$ | $—C_4H_8—$ | —H | —H | —H | $I^-$ |
| A5 | $—CH_2—$ | $—C_{10}H_{20}—$ | —H | —H | —H | $(FSO_2)_2N^-$ |
| A6 | $—CH_2—$ | $—C_3H_6—$ | —H | —H | —H | $PF_6^-$ |
| A7 | $—C_2H_4—$ | $—C_2H_4—$ | —H | —H | —H | $BF_4^-$ |
| A8 | $—CH_2—$ | $—CH_2—$ | —H | —H | $—CH{=}CH_2$ | $Br^-$ |
| A9 | $—CH_2—$ | $—CH_2—$ | —H | —H | $—O—CO—CH{=}CH_2$ | $CH_3COO^-$ |
| A10 | $—CH_2—$ | $—CH_2—$ | —H | —H | $—O—CO—C(CH_3){=}CH_2$ | $CH_3CH_2OPO_4^-$ |
| A11 | $—C_3H_6—$ | $—C_3H_6—$ | —H | —CN | —CN | $SCN^-$ |

TABLE 2

| Compound | Cation | | | | | | |
|---|---|---|---|---|---|---|---|
| number | $R^{b1}$ | $R^{b2}$ | $R^{b3}$ | $Z^{b1}$ | $Z^{b2}$ | $Z^{b3}$ | Anion |
| B1 | $—C_4H_8—$ | —H | —H | —H | — | — | $(CF_3SO_2)_2N^-$ |
| B2 | $—C_4H_8—$ | —H | —H | —H | — | — | $Cl^-$ |
| B3 | $—C_4H_8—$ | —H | $—CH_2—$ | —H | — | —H | $I^-$ |
| B4 | $—C_4H_8—$ | $—CH_2—$ | —H | —H | —H | — | $(CN)_2N^-$ |
| B5 | $—C_3H_6—$ | —H | —H | —H | — | — | $PF_6^-$ |
| B6 | $—C_2H_4—$ | —H | —H | —H | — | — | $BF_4^-$ |
| B7 | $—C_2H_4—$ | $—CH_2—$ | —H | —H | —H | — | $(C_4H_9)_2PO_4^-$ |
| B8 | $—C_3H_6—$ | —H | —H | —CN | — | — | $C_2H_5OPO_4^-$ |
| B9 | $—C_3H_6—$ | —H | —H | $—CH{=}CH_2$ | — | — | $CF_3SO_3^-$ |
| B10 | $—C_3H_6—$ | —H | —H | $—O—CO—CH{=}CH_2$ | — | — | $(C_2F_5SO_2)_2N^-$ |
| B11 | $—C_3H_6—$ | —H | —H | $—O—CO—C(CH_3){=}CH_2$ | — | — | $Br^-$ |

TABLE 3

| Compound | Cation | | | | | |
|---|---|---|---|---|---|---|
| number | $R^{c1}$ | $R^{c2}$ | $Z^{c1}$ | $Z^{c2}$ | n | Anion |
| C1 | $—CH_2—$ | $—C_4H_8—$ | —H | —H | 2 | $(CF_3SO_2)_2N^-$ |
| C2 | $—CH_2—$ | $—C_3H_6—$ | —H | —H | 2 | $Br^-$ |
| C3 | $—CH_2—$ | $—C_3H_6—$ | —H | —H | 2 | $(FSO_2)_2N^-$ |
| C4 | $—CH_2—$ | $—C_3H_6—$ | —H | —H | 2 | $BF_4^-$ |
| C5 | $—CH_2—$ | $—C_4H_8—$ | —H | —H | 1 | $C_2H_5OPO_4^-$ |
| C6 | $—CH_2—$ | $—C_2H_4—$ | —H | —H | 1 | $(CN)_2N^-$ |
| C7 | $—CH_2—$ | $—C_4H_8—$ | —H | —H | 1 | $Cl^-$ |
| C8 | $—CH_2—$ | $—C_3H_6—$ | $—CH{=}CH_2$ | —H | 2 | $(C_2F_5SO_2)_2N^-$ |
| C9 | $—CH_2—$ | $—C_3H_6—$ | $—O—CO—CH{=}CH_2$ | —H | 2 | $C_8H_{16}SO_4^-$ |
| C10 | $—CH_2—$ | $—C_3H_6—$ | $—O—CO—C(CH_3){=}CH_2$ | —H | 1 | $BF_4^-$ |

TABLE 4

| Compound | Cation | | | | | | |
|---|---|---|---|---|---|---|---|
| number | $R^{d1}$ | $R^{d2}$ | $R^{d3}$ | $R^{d4}$ | $Z^{d1}$ | $Z^{d2}$ | Anion |
| D1 | $—C_4H_8—$ | $—C_4H_8—$ | $—C_4H_9$ | $—C_4H_9$ | —H | —H | $(CF_3SO_2)_2N^-$ |
| D2 | $—CH_2—$ | $—C_8H_{16}—$ | $—C_8H_{17}$ | $—C_8H_{17}$ | —H | —H | $(FSO_2)_2N^-$ |
| D3 | $—CH_2—$ | $—C_2H_4—$ | $—C_2H_5$ | $—C_3H_7$ | —H | —H | $I^-$ |
| D4 | $—CH_2—$ | $—C_4H_8—$ | $—C_4H_9$ | $—C_3H_7$ | —H | —H | $(CN)_2N^-$ |
| D5 | $—CH_2—$ | $—CH_2—$ | $—CH_3$ | $—C_4H_9$ | —H | —H | $CF_3COO^-$ |
| D6 | $—CH_2—$ | $—CH_2—$ | $—C_2H_5$ | $—C_4H_9$ | $—CH{=}CH_2$ | $—CH{=}CH_2$ | $(C_4H_9)_2PO_4^-$ |
| D7 | $—CH_2—$ | $—C_2H_4—$ | $—C_2H_5$ | $—C_4H_9$ | $—O—CO—CH{=}CH_2$ | —H | $CH_3SO_3^-$ |
| D8 | $—CH_2—$ | $—C_2H_4—$ | $—C_2H_5$ | $—C_4H_9$ | $—O—CO—C(CH_3){=}CH_2$ | —H | $CF_3SO_3^-$ |

TABLE 4-continued

| Compound | Cation | | | | | | |
|---|---|---|---|---|---|---|---|
| number | $R^{d1}$ | $R^{d2}$ | $R^{d3}$ | $R^{d4}$ | $Z^{d1}$ | $Z^{d2}$ | Anion |
| D9 | $-CH_2-$ | $-CH_2-$ | $-CH_3$ | $-C_4H_9$ | $-H$ | $-H$ | $Br^-$ |
| D10 | $-CH_2-$ | $-CH_2-$ | $-CH_3$ | $-C_4H_9$ | $-H$ | $-H$ | $(CF_3SO_2)_2N^-$ |

TABLE 5

| Compound | Cation | | | | | | |
|---|---|---|---|---|---|---|---|
| number | $R^{e1}$ | $R^{e2}$ | $R^{e3}$ | $R^{e4}$ | $Z^{e1}$ | $Z^{e2}$ | Anion |
| E1 | $-CH_2-$ | $-C_4H_8-$ | $-C_4H_9$ | $-C_4H_9$ | $-H$ | $-H$ | $(CF_3SO_2)_2N^-$ |
| E2 | $-C_4H_8-$ | $-C_4H_8-$ | $-C_4H_9$ | $-C_8H_{17}$ | $-H$ | $-H$ | $(FSO_2)_2N^-$ |
| E3 | $-C_6H_{12}-$ | $-C_6H_{12}-$ | $-C_6H_{12}$ | $-C_8H_{17}$ | $-H$ | $-H$ | $Cl^-$ |
| E4 | $-C_4H_8-$ | $-C_4H_8-$ | $-C_4H_9$ | $-C_4H_9$ | $-H$ | $-H$ | $C_3H_7COO^-$ |
| E5 | $-C_8H_{16}-$ | $-C_8H_{16}-$ | $-C_8H_{17}$ | $-C_8H_{17}$ | $-H$ | $-H$ | $(C_4H_9)_2PO_4^-$ |
| E6 | $-CH_2-$ | $-C_2H_4-$ | $-C_2H_5$ | $-C_2H_5$ | $-H$ | $-H$ | $I^-$ |
| E7 | $-CH_2-$ | $-C_2H_4-$ | $-C_2H_5$ | $-C_2H_5$ | $-O-CO-CH{=}CH_2$ | $-O-CO-CH{=}CH_2$ | $(CF_3SO_2)_2N^-$ |
| E8 | $-CH_2-$ | $-C_2H_4-$ | $-C_2H_5$ | $-C_2H_5$ | $-CH{=}CH_2$ | $-H$ | $Br^-$ |
| E9 | $-CH_2-$ | $-C_2H_4-$ | $-C_2H_5$ | $-C_2H_5$ | $-O-CO-CH{=}CH_2$ | $-H$ | $C_4F_9SO_3^-$ |
| E10 | $-CH_2-$ | $-C_2H_4-$ | $-C_2H_5$ | $-C_2H_5$ | $-O-CO-C(CH_3){=}CH_2$ | $-H$ | $CF_3BF_3^-$ |

The surface protective layer according to the present invention may contain a charge-transporting substance, and examples of the charge-transporting substance include a polycyclic aromatic compound, a heterocyclic compound, a hydrazone compound, a styryl compound, an enamine compound, a benzidine compound, a triarylamine compound, and a resin having a group derived from any of those substances. Of those, a triarylamine compound and a benzidine compound are preferred.

The surface protective layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The surface protective layer has an average thickness of preferably 0.3 μm to 10 μm, more preferably 0.5 μm to 7 μm.

The surface protective layer may be formed by: preparing a coating liquid for a surface protective layer containing the above-mentioned components of the composition and a solvent; forming a coat thereof on the photosensitive layer; and curing the coat through a polymerization reaction. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

As a method of forming the polymerized film from the coat, there may be used a method involving applying energy, such as UV light, an electron beam, or heat, or a method involving causing an auxiliary agent such as a polymerization initiator, and a compound, such as an acid, an alkali, or a complex, to coexist.

Of those, radiations are preferred, and of the radiations, an electron beam is more preferred.

[Process Cartridge and Electrophotographic Apparatus]

A process cartridge of the present invention has a feature of integrally supporting the electrophotographic photosensitive member described in the foregoing, and at least one unit selected from the group consisting of: a charging unit; a developing unit; and a cleaning unit, and being removably mounted onto the main body of an electrophotographic apparatus.

In addition, an electrophotographic apparatus of the present invention has a feature of including: the electrophotographic photosensitive member described in the foregoing; a charging unit; an exposing unit; a developing unit; and a transferring unit.

Figure 1:
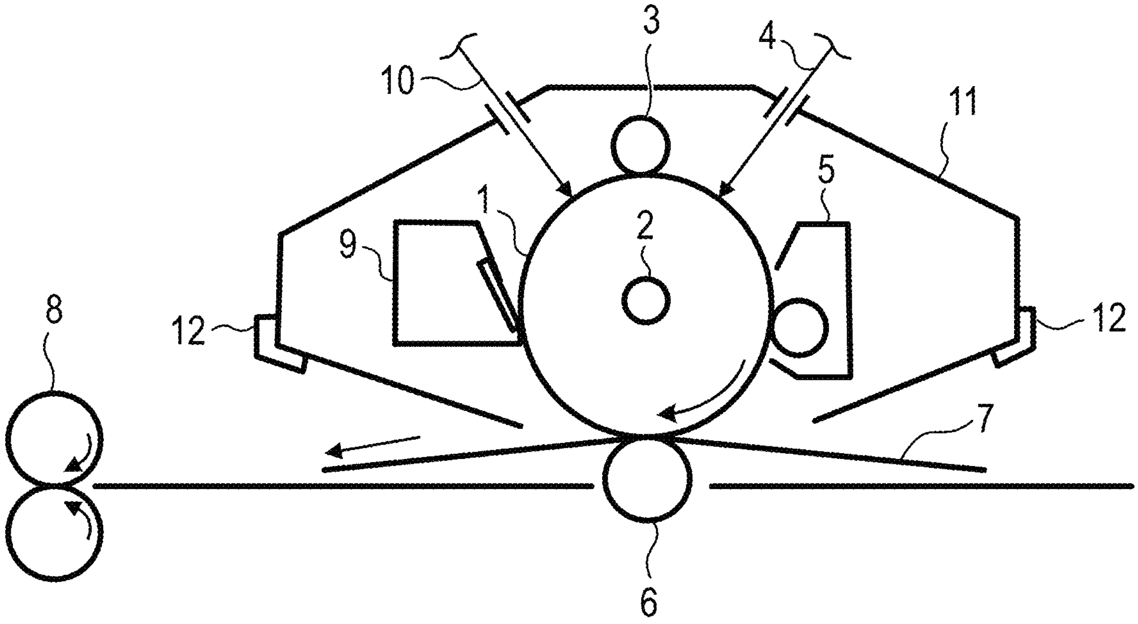
FIG. 1 is a view for illustrating an example of the schematic configuration of a process cartridge including an electrophotographic photosensitive member of the present invention and an electrophotographic apparatus including the process cartridge.

An example of the schematic configuration of an electrophotographic apparatus including a process cartridge including an electrophotographic photosensitive member is illustrated in FIG. 1.

An electrophotographic photosensitive member 1 of a cylindrical shape is rotationally driven about a shaft 2 in a direction indicated by the arrow at a predetermined peripheral speed. The surface of the electrophotographic photosensitive member 1 is charged to a predetermined positive or negative potential by a charging unit 3. In FIG. 1, a roller charging system based on a roller-type charging member is illustrated, but a charging system, such as a corona charging system, a proximity charging system, or an injection charging system, may be adopted. The charged surface of the electrophotographic photosensitive member 1 is irradiated with exposure light 4 from an exposing unit (not shown), and hence an electrostatic latent image corresponding to target image information is formed thereon. The electrostatic latent image formed on the surface of the electrophotographic photosensitive member 1 is developed with toner stored in a developing unit 5 to form a toner image on the surface of the electrophotographic photosensitive member 1. The toner image formed on the surface of the electrophotographic photosensitive member 1 is transferred by a transferring unit 6 onto a transfer material 7. The transfer material 7 onto which the toner image has been transferred is conveyed to a fixing unit 8, and is subjected to treatment for fixing the toner image to be printed out to the outside of an electrophotographic apparatus. The electrophotographic apparatus may include a cleaning unit 9 for removing a deposit such as the toner remaining on the surface of the electrophotographic photosensitive member 1 after the transfer. In addition, a so-called cleaner-less system for removing the deposit with the developing unit or the like without separate arrangement of the cleaning unit may be used. The electrophotographic apparatus may include an electricity-removing mechanism for subjecting the surface of the electrophotographic photosensitive member 1 to electricity-removing treatment with pre-exposure light 10 from a pre-exposing unit (not shown). In addition, a guiding unit 12 such as a rail may be arranged for removably mounting a process cartridge 11 of the present invention onto the main body of the electrophotographic apparatus.

The electrophotographic photosensitive member of the present invention can be used in, for example, a laser beam printer, an LED printer, a copying machine, a facsimile, and a multifunctional peripheral thereof.

EXAMPLES

The present invention is described in more detail below by way of Examples and Comparative Examples. The present invention is by no means limited to the following Examples, and various modifications may be made without departing from the gist of the present invention. In the description in the following Examples, the term "part(s)" is by mass unless otherwise specified.

The present invention is described in more detail below by way of Examples. In Examples, the term "part(s)" means "part(s) by mass".

[Production of Conductive Particle]

(Conductive Particle X1)

Anatase-type titanium oxide particles having an average primary particle diameter of 150 nm were used as core particles. 100 g of the core was dispersed in water to give 1 L of an aqueous suspension, which was heated to 60° C. Niobium(V) hydroxide corresponding to 2.1 g in terms of niobium was dissolved in concentrated sulfuric acid, and the solution was mixed with an aqueous solution of titanium sulfate having a content of 33.7 g in terms of Ti to prepare an acidic mixed liquid of a niobium salt and a titanium salt (hereinafter referred to as "titanium-niobium mixed liquid"). The titanium-niobium mixed liquid and a 10.7 mol/L sodium hydroxide solution were simultaneously added dropwise (parallel addition) over 3 hours so that the suspension had a pH of from 2 to 3.

After the completion of the dropwise addition, the pH was adjusted to be near-neutral, and a flocculant was added to settle a solid content. The supernatant was removed, the remainder was filtered, and the residue was washed, dried at 110° C., and then fired in a nitrogen gas at 800° C. for 1 hour to produce conductive particle X1 having an average particle diameter of 175 nm.

The niobium amount in titanium oxide was 2.8 mass % (elemental analysis with X-ray fluorescence).

(Conductive Particle X2)

Conductive particle X2 was produced under the same production conditions as the conductive particle X1 except that niobium(V) hydroxide corresponding to 4.2 g in terms of niobium was dissolved in concentrated sulfuric acid. The average particle diameter was 178 nm, and the niobium amount was 5.5 mass %.

(Conductive Particle X3)

Particle X3 was produced in the same manner as X1 except that the amount of the titanium-niobium mixed liquid to be added dropwise to the suspension of the core particles was halved.

(Conductive Particle X4)

Particle X4 was produced in the same manner as X1 except that the amount of the titanium-niobium mixed liquid to be added dropwise to the suspension of the core particles was reduced to one third.

(Conductive Particle X5)

Niobium sulfate was added to an aqueous solution of titanyl sulfate at a ratio of 5.0 mass % in terms of niobium ions with respect to a titanium amount (in terms of titanium dioxide), and the resultant was hydrolyzed to provide a hydrous titanium dioxide slurry. Next, the hydrous titanium dioxide slurry containing niobium ions and the like was dewatered, and fired in the air at a firing temperature of 950° C. to produce conductive particle X5. The average particle diameter was 105 nm, and the niobium amount was 2.7%.

(Conductive Particle X6)

Conductive particle X6 was produced under the same production conditions as the conductive particle X5 except that the amount of niobium sulfate to be added to the aqueous solution of titanyl sulfate was changed to 3.5 mass % in terms of niobium ions with respect to the titanium amount (in terms of titanium dioxide). The average particle diameter was 112 nm, and the niobium amount was 2.0%.

Example 1

<Production of Electrophotographic Photosensitive Member>

An aluminum cylinder having a diameter of 24 mm and a length of 257.5 mm (JIS-A3003, aluminum alloy) was used as a support (conductive support).

Next, 50 parts of titanium oxide particles coated with oxygen-deficient tin oxide (powder resistivity: 120 Ω·cm, tin oxide coating ratio: 40%), 40 parts of a phenol resin (PLYOPHEN J-325, manufactured by Dainippon Ink and Chemicals, Incorporated, resin solid content: 60%), and 55 parts of methoxypropanol were placed in a sand mill using glass beads each having a diameter of 1 mm, and were subjected to dispersion treatment for 3 hours to prepare a coating liquid for a conductive layer.

The average particle diameter of the titanium oxide particles coated with oxygen-deficient tin oxide in the coating liquid for a conductive layer was measured with a particle size analyzer manufactured by Horiba, Ltd. (product name: CAPA700) using tetrahydrofuran as a dispersion medium by a centrifugal sedimentation method at a rotation speed of 5,000 rpm. As a result, the average particle diameter was found to be 0.30 μm.

The coating liquid for a conductive layer was applied onto the support by dip coating, and the resultant coat was dried at 160° C. for 30 minutes to form a conductive layer having a thickness of 30 μm.

Next, 100 parts of rutile-type titanium oxide particles having an average primary particle diameter of 50 nm were stirred and mixed with 500 parts of toluene, 35 parts of vinyltrimethoxysilane was added, and the whole was stirred for 8 hours. After that, toluene was removed by evaporation through vacuum distillation, and the residue was baked at 120° C. for 3 hours to provide rutile-type titanium oxide particles surface-treated with vinyltrimethoxysilane.

120 Parts of glass beads each having a diameter of 1 mm were added to 4.5 parts of N-methoxymethylated nylon (product name: TORESIN EF-30T, manufactured by Nagase ChemteX Corporation), 1.5 parts of a copolymer nylon resin (product name: AMILAN CM8000, manufactured by Toray Industries, Inc.), 18 parts of the rutile-type titanium oxide particles surface-treated with vinyltrimethoxysilane obtained by the procedure described above, 65 parts of methanol, and 30 parts of n-butanol, and dispersion treatment was performed for 6 hours using a paint shaker to provide a dispersion liquid. The glass beads were removed from the dispersion liquid with a mesh, and the remainder was subjected to pressure filtration using PTFE filter paper (product name: PF060, manufactured by Advantec Toyo Kaisha, Ltd.) to prepare a coating liquid 2 for an undercoat layer. The coating liquid 2 for an undercoat layer was applied onto the conductive layer by dip coating, and the resultant coat was dried at 100° C. for 10 minutes to form an undercoat layer having a thickness of 2.0 μm.

Next, a hydroxygallium phthalocyanine crystal (charge-generating substance) of a crystal form having peaks at Bragg angles (2θ±0.2°) of 7.5°, 9.9°, 12.5°, 16.3°, 18.6°, 25.1°, and 28.3° in CuKα characteristic X-ray diffraction was prepared. 8 Parts of the hydroxygallium phthalocyanine crystal, 4 parts of polyvinyl butyral (product name: S-LEC BX-1, manufactured by Sekisui Chemical Co., Ltd.), and 250 parts of cyclohexanone were placed in a sand mill using glass beads each having a diameter of 1 mm, and were subjected to dispersion treatment for 2 hours. Next, 250 parts of ethyl acetate was added thereto to prepare a coating liquid for a charge-generating layer.

The coating liquid for a charge-generating layer was applied onto the undercoat layer by dip coating to form a coat, and the resultant coat was dried at 95° C. for 10 minutes to form a charge-generating layer having a thickness of 0.2 μm.

Next, 6 parts of an amine compound (hole-transporting substance) represented by the following formula (1), 2 parts of an amine compound (hole-transporting substance) represented by the following formula (2), and 10 parts of a polyester resin having structural units represented by the following formulae (3) and (4) at a ratio of 5/5, and having a weight-average molecular weight (Mw) of 100,000 were dissolved in a mixed solvent of 40 parts of dimethoxymethane and 60 parts of chlorobenzene to prepare a coating liquid for a charge-transporting layer.

(1)

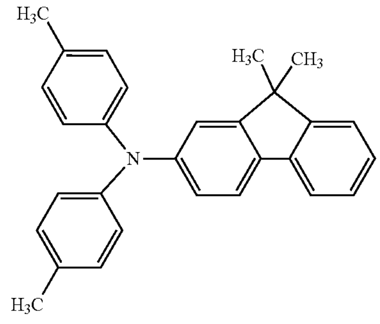

(2)

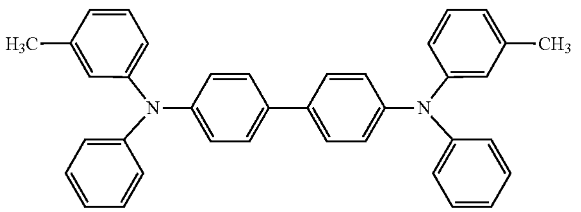

-continued (3)

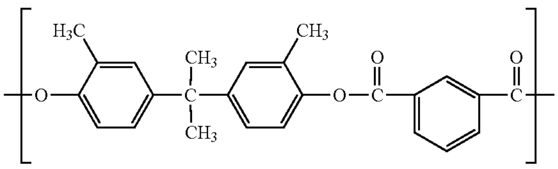

(4)

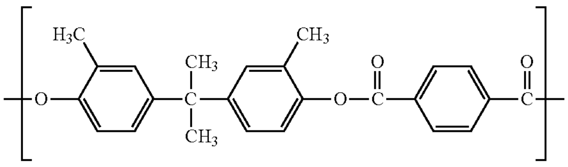

The coating liquid for a charge-transporting layer was applied onto the charge-generating layer by dip coating, and the resultant coat was dried at 120° C. for 40 minutes to form a charge-transporting layer having a thickness of 22 μm.

Next, 20 parts of a compound represented by the following structural formula (5) was mixed with a mixed solvent of 130 parts of 2-propanol and 14 parts of tetrahydrofuran. To the solution, 40 parts of the conductive particle X1 and 2.00 parts of the organic salt A1 (see Table 1) were added, and the whole was stirred.

(5)

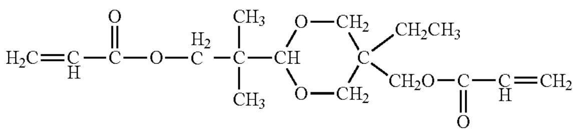

Those materials were placed in a vertical sand mill using 200 parts of glass beads having an average particle diameter of 1.0 mm, and were subjected to dispersion treatment under the conditions of a dispersion liquid temperature of 23±3° C. and a rotation speed of 1,500 rpm (peripheral speed: 5.5 m/s) for 2 hours to provide a dispersion liquid.

The glass beads were removed from the dispersion liquid with a mesh, and the resultant dispersion liquid was subjected to pressure filtration using PTFE filter paper (product name: PF060, manufactured by Advantec Toyo Kaisha, Ltd.) to prepare a coating liquid for a surface protective layer.

Next, the coating liquid for a surface protective layer was applied onto the charge-transporting layer by dip coating to form a coat, and the resultant coat was dried at 50° C. for 6 minutes. After that, under a nitrogen atmosphere, the coat was irradiated with an electron beam for 1.6 seconds under the conditions of an acceleration voltage of 70 kV and a beam current of 2.0 mA while the support (body to be irradiated) was rotated at a speed of 300 rpm. An oxygen concentration during the electron beam irradiation was 810 ppm. Next, in the air, the coat was naturally cooled until its temperature became 25° C., and then heating treatment was performed for 1 hour under such a condition that the temperature of the coat became 120° C., to thereby form a surface protective layer having a thickness of 3 μm. Thus, an electrophotographic photosensitive member of a cylindrical shape (drum shape) including a surface protective layer of Example 1 was produced.

<Evaluation>

First, with regard to each of X1 to X5, in which the conductive material added to the protective layer was titanium oxide containing niobium, a 5 mm square was cut out of the electrophotographic photosensitive member at each of three points, i.e., the upper end, center, and lower end of the electrophotographic photosensitive member. The cutout sample was machined in a direction perpendicular to the longitudinal direction of the electrophotographic photosensitive member with an ultrasonic ultramicrotome (EMS, manufactured by Leica) so as to have a thickness of 60 nm, to thereby produce a slice-shaped sample.

And, a sliced-shaped sample obtained of the cutout sample piece was observed using the scanning image mode of a scanning transmission electron microscope (JEOL, JEM 2800), and STEM images of 100 conductive particle pieces were taken at magnification of 200 thousand to 1.2 million times. Each maximum diameter of the conductive particles in the obtained STEM image was measured, and the number average diameter was calculated on the basis of that of them to be the primary particle diameter of the conductive fine particles.

Next, elemental analysis was performed on 100 conductive particles by EDS (NORAN SYSTEM 7, manufactured by Thermo Fisher Scientific). As the measurement conditions of the EDS, an acceleration voltage was 200 kV and a probe size of 1.0 nm or 1.5 nm was appropriately selected so that the dead time was 15 to 30. A mapping resolution of 256×256 and a frame number of 300 were selected. From the result thus obtained, the niobium/titanium atomic concentration at the inside portion at 5% of the maximum diameter of the particle from the surface particle with respect to the niobium/titanium atomic concentration at the central portion was measured. Specifically, by first pressing the "line extraction" button and drawing a line so as to set the maximum diameter of particle, information on the atomic concentration (atomic %) inside the particle was obtained by line scanning. Next, the atomic concentrations of niobium (atomic %) and titanium (atomic %) at the central portion of the particle (nm), and the atomic concentrations of niobium (atomic %) and titanium (atomic %) at the inside portion at 5% (nm) of the maximum diameter of the particle from surface of the particle were read, and the niobium/titanium atomic concentration ratio [Rf] at the inside portion at 5% of the maximum diameter of the particle from the surface of the particle to the niobium/titanium atomic concentration ratio [Rc] at the center of particle was calculated to be [Rf/Rc]. The central portion of the particle was set to the midpoint of a line drawn to be the maximum diameter of the particle, and the inside portion at 5% of the maximum diameter of the particle from the surface of the particle was calculated from the average of two points inside of 5% of the maximum diameter of the particle from both ends of the line. The results are shown in Table 6.

Next, the produced electrophotographic photosensitive member was used and evaluated for chargeability and fogging under the following conditions.

A reconstructed machine of a laser beam printer manufactured under the product name HP LaserJet Enterprise Color M553dn by Hewlett-Packard Company was used as an electrophotographic apparatus. The electrophotographic apparatus used for evaluation was reconstructed so as to be capable of regulating and measuring an image exposure amount and a developing bias.

First, the exposure amount was adjusted so that the electrophotographic photosensitive member had a light portion potential of −180 V, and then its dark portion potential (Vd) was measured.

After that, the developing bias Vdc was adjusted to −450 V, and the electrophotographic photosensitive member was mounted into the cyan color cartridge of the electrophotographic apparatus.

After that, a solid white image was output with a single cyan color on A4 size plain paper under an environment having a temperature of 23° C. and a relative humidity of 50%.

Fogging evaluation was performed as follows: the reflectance of each of the white portion of the above-mentioned image and unused paper was measured with a white photometer (product name; REFLECTMETER TC-6DS/A, manufactured by Tokyo Denshoku Co., Ltd.), and a difference therebetween was defined as fogging. Based on the equation "reflectance of unused paper-reflectance of white portion of image=fogging %," a fogging of 2.0% or more was evaluated as NG. The result is shown in Table 6.

Examples 2 to 30 and Comparative Examples 1 to 17

Electrophotographic photosensitive members were produced and evaluated in the same manner as in Example 1 except that the kinds and contents of the compound having one of an acryloyloxy group or a methacryloyloxy group and the conductive particle used in the production of the electrophotographic photosensitive member, and the kind and content of the organic salt were changed as shown in Table 6.

As the conductive particle, there were used, in addition to X1 to X6 described in the production of the conductive particle, conductive particle X7 (titanium oxide particles AMT600, manufactured by Tayca Corporation (particle diameter: 30 nm)), conductive particle X8 (titanium oxide particles SC150, manufactured by Tayca Corporation (particle diameter: 50 nm)), conductive particle X9 (zinc oxide particles SC064, manufactured by Tayca Corporation (particle diameter: 70 nm)), and conductive particle X10 (tin oxide particles S-2000, manufactured by Mitsubishi Materials Corporation).

As the organic salt, there were used organic salts shown in Tables 1 to 5, and an organic salt (6) represented by the following formula.

(6)

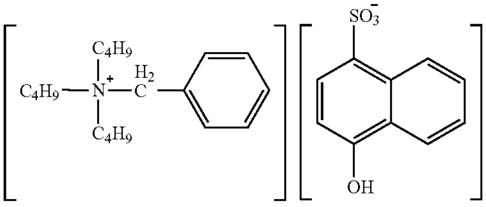

TABLE 6

| Example No. | Conductive particle | Ratio [Rf/Rc] of Nb/Ti atom count ratio [Rf] at inside portion at 5% of primary particle diameter from particle surface to Nb/Ti atom count ratio [Rc] at particle central portion | Conductive particle (part(s) by mass) | Organic salt No. | Organic salt (part(s) by mass) | Compound having one of acryloyloxy group or methacryloyloxy group | Vd (−V) | Fogging |
|---|---|---|---|---|---|---|---|---|
| 1 | X1 | 8.1 | 40 | A1 | 2.00 | (5) | 635 | 1.3% |
| 2 | X1 | 8.1 | 40 | A1 | 4.00 | (5) | 633 | 1.3% |
| 3 | X1 | 8.1 | 40 | A1 | 0.04 | (5) | 627 | 1.3% |
| 4 | X1 | 8.1 | 40 | A3 | 2.00 | (5) | 630 | 1.3% |
| 5 | X1 | 8.1 | 40 | D4 | 2.00 | (5) | 632 | 1.3% |
| 6 | X1 | 8.1 | 40 | D6 | 2.00 | (5) | 631 | 1.3% |
| 7 | X1 | 8.1 | 40 | C7 | 2.00 | (5) | 629 | 1.3% |
| 8 | X1 | 8.1 | 40 | C1 | 2.00 | (5) | 633 | 1.3% |
| 9 | X1 | 8.1 | 40 | B5 | 2.00 | (5) | 632 | 1.3% |
| 10 | X2 | 8.8 | 40 | E1 | 2.00 | Hexamethylene glycol dimethacrylate | 630 | 1.3% |
| 11 | X3 | 5.1 | 40 | A4 | 2.00 | (5) | 635 | 1.3% |
| 12 | X4 | 2.0 | 40 | A4 | 2.00 | (5) | 633 | 1.3% |
| 13 | X5 | 1.4 | 40 | A4 | 2.00 | (5) | 623 | 1.3% |
| 14 | X5 | 1.4 | 40 | A4 | 4.00 | (5) | 622 | 1.3% |
| 15 | X5 | 1.4 | 40 | A4 | 0.04 | (5) | 618 | 1.3% |
| 16 | X5 | 1.4 | 40 | D2 | 2.00 | (5) | 620 | 1.3% |
| 17 | X6 | 1.4 | 40 | B8 | 2.00 | (5) | 615 | 1.3% |
| 18 | X10 | — | 69 | D1 | 3.45 | (5) | 612 | 1.3% |
| 19 | X10 | — | 69 | D1 | 6.90 | (5) | 610 | 1.3% |
| 20 | X10 | — | 69 | D1 | 0.07 | (5) | 608 | 1.3% |
| 21 | X10 | — | 69 | A10 | 3.45 | (5) | 611 | 1.3% |
| 22 | X10 | — | 69 | B10 | 3.45 | Hexamethylene glycol dimethacrylate | 611 | 1.3% |
| 23 | X7 | — | 40 | B1 | 2.00 | (5) | 606 | 1.6% |
| 24 | X7 | — | 40 | B1 | 4.00 | (5) | 604 | 1.6% |
| 25 | X7 | — | 40 | B1 | 0.04 | (5) | 602 | 1.6% |
| 26 | X7 | — | 40 | C6 | 2.00 | (5) | 607 | 1.6% |
| 27 | X8 | — | 40 | D9 | 2.00 | (5) | 601 | 1.6% |
| 28 | X9 | — | 56 | C5 | 2.80 | (5) | 605 | 1.6% |
| 29 | X9 | — | 56 | C5 | 5.60 | (5) | 605 | 1.6% |
| 30 | X9 | — | 56 | C5 | 0.06 | (5) | 603 | 1.6% |
| 31 | X9 | — | 56 | E3 | 2.80 | (5) | 607 | 1.6% |
| 32 | X9 | — | 56 | A11 | 2.80 | (5) | 606 | 1.6% |
| Comparative Example 1 | X7 | — | 40 | E1 | 0.01 | (5) | 511 | 5.0% |
| Comparative Example 2 | X7 | — | 40 | E1 | 8.00 | (5) | 514 | 5.0% |
| Comparative Example 3 | X7 | — | 40 | A5 | — | (5) | 505 | 5.0% |
| Comparative Example 4 | X7 | — | 40 | A5 | 8.00 | (5) | 504 | 5.0% |
| Comparative Example 5 | X7 | — | 40 | B1 | 0.01 | (5) | 503 | 5.0% |
| Comparative Example 6 | X6 | — | 40 | B1 | 8.00 | (5) | 506 | 5.0% |
| Comparative Example 7 | X10 | — | 69 | D1 | 0.01 | (5) | 507 | 5.0% |
| Comparative Example 8 | X10 | — | 69 | D1 | 13.80 | (5) | 510 | 5.0% |
| Comparative Example 9 | X9 | — | 56 | C5 | 0.01 | (5) | 505 | 5.0% |
| Comparative Example 10 | X9 | — | 56 | C5 | 11.20 | (5) | 503 | 5.0% |
| Comparative Example 11 | X7 | — | 40 | — | — | (5) | 505 | 5.0% |
| Comparative Example 12 | — | — | — | B1 | 8.00 | (5) | 511 | 5.0% |
| Comparative Example 13 | — | — | — | B1 | 6.90 | (5) | 504 | 5.0% |
| Comparative Example 14 | — | — | — | — | — | (5) | 500 | 5.0% |
| Comparative Example 15 | X9 | — | 56 | (6) | 5.60 | (5) | 480 | >10% |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-150501, filed Sep. 15, 2021, and Japanese Patent Application No. 2022-132499, filed Aug. 23, 2022, which are hereby incorporated by reference herein in their entirety.

What is claimed is:

1. An electrophotographic photosensitive member comprising a surface protective layer:
   - the surface protective layer being a polymerized film of a composition comprising (i) a compound having one of an acryloyloxy group or a methacryloyloxy group, (ii) a conductive particle and (iii) an organic salt;
   - the conductive particle being a titanium oxide particle containing niobium;
   - the organic salt being formed of at least one organic cation and at least one anion;
   - the organic cation being selected from the group consisting of imidazolium, pyridinium, pyrrolidinium, piperidinium, a tetraalkylammonium and a tetraalkylphosphonium; and
   - the anion being selected from the group consisting of an organic anion and an inorganic anion, wherein
   - a content of the organic salt is 0.1 to 10.0 mass % with respect to a total mass of the conductive particle, and
   - a content of the niobium in the conductive particle is 2.6 to 10.0 mass % with respect to a total mass of the conductive particle.

2. The electrophotographic photosensitive member according to claim 1, wherein the organic salt is represented by any one of formulae (A) to (E)

(A)

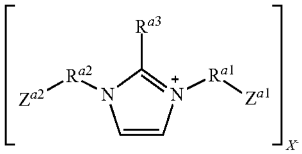

(B)

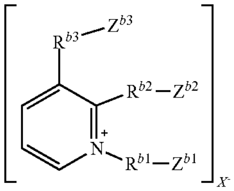

(C)

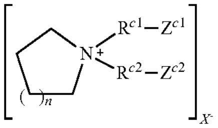

(D)

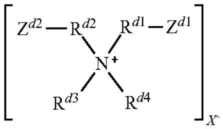

-continued (E)

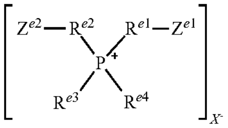

when $R^{a1}$, $R^{a2}$, $R^{b1}$, $R^{b2}$, $R^{b3}$, $R^{e1}$, $R^{e2}$, $R^{d1}$, $R^{d2}$, $R^{e1}$ and $R^{e2}$ independently represent an alkylene group having 8 or less carbon atoms, $R^{a3}$, $R^{d3}$, $R^{d4}$, $R^{e3}$ and $R^{e4}$ independently represent a hydrogen atom or an alkyl group having 8 or less carbon atoms, $Z^{a1}$, $Z^{a2}$, $z^{b1}$, $z^{b2}$, $z^{b3}$, $z^{e1}$, $z^{e2}$, $z^{d1}$, $z^{d2}$, $z^{e1}$ and $Z^{e2}$ independently represent a functional group selected from the group consisting of a hydrogen atom, a cyano group, an acryloyloxy group, a methacryloyloxy group and a vinyl group, and $X^-$s independently represent an anion selected from the group consisting of $Cl^-$, $Br^-$, $I^-$, $R^{f1}COO$ where $R^{f1}$ represents an alkyl group or a perfluoroalkyl group having 3 or less carbon atoms, $R^{f2}PO_4^-$ where $R^{f2}$ represents an alkyl group having 4 or less carbon atoms, $R^{f3}SO_4^-$ where $R^{f3}$ represents an alkyl group having 8 or less carbon atoms, $R^{f4}SO_3^-$ where $R^{f4}$ represents an alkyl group or a perfluoroalkyl group having 4 or less carbon atoms, $(R^{f5}SO_2)N^-$ where $R^{f5}$ represents F or a perfluoroalkyl group having 2 or less carbon atoms, $R^{f6}BF_2$ where $R^{f6}$ represents F or a trifluoromethyl group, $SCN^-$ and $(CN)_2N^-$, and n represents 1 or 2.

3. The electrophotographic photosensitive member according to claim 1, wherein the polymerized film contains a polymerization product of a composition containing the organic salt.

4. The electrophotographic photosensitive member according to claim 1, wherein the electrophotographic photosensitive member comprises a support, a charge-generating layer, a charge-transporting layer and the surface protective layer, in this order.

5. A process cartridge, comprising:
   - an electrophotographic photosensitive member comprising a surface protective layer; and
   - at least one unit selected from the group consisting of a charging unit, a developing unit and a cleaning unit;
   - the process cartridge integrally supporting the electrophotographic photosensitive member and the at least one unit, and being removably mounted onto a main body of an electrophotographic apparatus;
   - the surface protective layer being a polymerized film of a composition comprising (i) a compound having one of an acryloyloxy group or a methacryloyloxy group, (ii) a conductive particle and (iii) an organic salt;
   - the conductive particle being a titanium oxide particle containing niobium;
   - the organic salt being formed of at least one organic cation and at least one anion;
   - the organic cation being selected from the group consisting of imidazolium, pyridinium, pyrrolidinium, piperidinium, a tetraalkylammonium and a tetraalkylphosphonium; and
   - the anion being selected from the group consisting of an organic anion and an inorganic anion, wherein
   - a content of the organic salt is 0.1 to 10.0 mass % with respect to a total mass of the conductive particle, and a content of the niobium in the conductive particle is 2.6 to 10.0 mass % with respect to a total mass of the conductive particle.

6. An electrophotographic apparatus, comprising:

an electrophotographic photosensitive member comprising a surface protective layer;

a charging unit;

an exposing unit;

a developing unit; and a transferring unit;

the surface protective layer being a polymerized film of a composition comprising (i) a compound having one of an acryloyloxy group or a methacryloyloxy group, (ii) a conductive particle and (iii) an organic salt;

the conductive particle being a titanium oxide particle containing niobium;

the organic salt being formed of at least one organic cation and at least one anion;

the organic cation being selected from the group consisting of imidazolium, pyridinium, pyrrolidinium, piperidinium, a tetraalkylammonium and a tetraalkylphosphonium; and the anion being selected from the group consisting of an organic anion and an inorganic anion, wherein a content of the organic salt is 0.1 to 10.0 mass % with respect to a total mass of the conductive particle, and a content of the niobium in the conductive particle is 2.6 to 10.0 mass % with respect to a total mass of the conductive particle.

* * * * *